United States Patent [19]

Flaten

[11] 4,127,942
[45] Dec. 5, 1978

[54] METHOD AND APPARATUS FOR RECONDITIONING CYLINDER HEADS

[75] Inventor: James F. Flaten, Burnsville, Minn.

[73] Assignee: Tobin-Arp Manufacturing Company, Eden Prairie, Minn.

[21] Appl. No.: 771,933

[22] Filed: Feb. 25, 1977

[51] Int. Cl.² ............................................... G01B 3/30
[52] U.S. Cl. .............................. 33/181 AT; 33/185 V; 408/75; 408/709
[58] Field of Search .......... 33/185 V, 185 R, 180 AT, 33/181 AT; 408/75, 79, 708, 709, 1 R

[56] References Cited

U.S. PATENT DOCUMENTS

| 1,877,477 | 9/1932 | Gladding | 33/180 AT |
| 3,686,768 | 8/1972 | Humbert | 33/185 R |
| 3,763,570 | 10/1973 | Andersen | 33/370 |
| 3,782,847 | 1/1974 | Kulzer | 408/75 |
| 3,869,803 | 3/1975 | Vaughan | 33/181 AT |
| 3,977,805 | 8/1976 | Wanous | 408/709 |

*Primary Examiner*—Richard E. Aegerter
*Assistant Examiner*—Willis Little
*Attorney, Agent, or Firm*—Nickolas E. Westman

[57] ABSTRACT

An apparatus and method for reconditioning cylinder heads and more particularly for permitting proper, quick, and easy alignment of the cylinder head relative to a machine for drilling and reaming valve guides for reconditioning the valve guides in the head. The method pertains particularly to orienting properly the axes of the valve guides to be reconditioned when the valve guides are canted at a compound angle with respect to the plane surface of the head, which is used for mounting the head onto a cylinder block.

8 Claims, 9 Drawing Figures

METHOD AND APPARATUS FOR RECONDITIONING CYLINDER HEADS

BACKGROUND OF THE INVENTION

1. Field of the Invention

The present invention relates to apparatus and methods for reconditioning engine cylinder heads.

2. Prior Art

In the prior art, various apparatus has been advanced for reconditioning cylinder heads. U.S. Pat. No. 3,782,847 shows a method and apparatus utilizing a drill press like machine, and a cylinder head support frame that permits rotation of the head in two mutually perpendicular horizontal axis, and thus, entails a quite large support, and complex method to obtain proper alignment of the valve guide bores.

Other devices provide for proper positioning of guide members in the head itself, such as that shown in U.S. Pat. No. 3,764,204 issued to Kammeraad. This device has a valve guide boring fixture that mounts directly into the valve head and guides a boring tool. It utilizes a tapered alignment pin for obtaining the necessary alignment of the boring tool with the valve guide bore.

U.S. Pat. No. 3,799,687 also relates to tooling for valve guide reconditioning, and comprises a fixture that mounts onto the valve head and can be used for guiding a reamer or tool that can be either hand held or machine held.

U.S. Pat. No. 3,977,805 shows a tool bar holder for use in reconditioning automotive or engine heads, aligns a guide bar with a row of valve guides, and using alignment pins as well, which pass through a slot in this bar after insertion in selected valve guides. The device is clamped onto the cylinder head, and the head is not held in a precise arrangement with any particular tool during operation. Other devices that illustrate the state of the art include U.S. Pat. No. 3,534,639 which shows a pivoting head for a drill press that permits tilting the axis of a drill bit or reamer. Other patents which illustrate the state of the art include U.S. Pat. Nos. 3,034,380 and 3,333,487.

Also, prior art devices which used a bubble level for alignment have been known. However in this application an alignment bar which permits establishing a plane in a desired position is used and provides great accuracy in operation.

SUMMARY OF THE INVENTION thus

The present invention relates to an engine head reconditioning device and method which permits the rapid orientation of the plane of the axes of compound angle valve guides into a perpendicular relationship with respect to a reference table or surface on the reconditioning machine. Once this reference position is achieved with the cylinder head, the axis of tilt of the valve guide bores can be duplicated by tilting the spindle axis of the machine, which is also mounted in a known relation with respect to this support table. The cylinder head to be reconditioned is carried in a fixture that is air supported and can be moved and guided with a parallel linkage fence to enable drilling and reaming of the valve guides aligned in the plane of all similarly canted valve guides without repositioning the head. The reconditioned guides are thus accurately aligned with the valve seat.

The device utilizes a drill press like machine which has a tilting power head, and which tilting of the power head for reconditioning cylinder heads has been known. However, the problem has been to properly orient the cylinder head on the work table so that the plane defined by the axes of the valve guides which are identically canted into position perpendicular to the table or support plane. If the valve guide axes cannot be reliably positioned perpendicular to the reference surface in at least one orthogonal direction obtaining correct alignment of the tool and the valve guide bore is extremely difficult.

It is important to note that in many engine heads now, the valve guides are canted relative to the reference surface in two directions, so that they extend at a compound angle. In other words, the plane that passes through the axes of the common valve guides, such as for the intake valves, is not perpendicular to the cylinder head mounting surface in any orthogonal direction. The valve guides are tilted in two directions. Not only that, many times the intake and exhaust valve guides are at different angles from each other, so that in operation first the intake valve guides will be reconditioned in a head, and then subsequently the exhaust valve guides will be reconditioned. In this instance, the present method using the alignment bar provides for the initial orientation of the axes of the valve guides lying in a common plane to a position perpendicular to a reference surface and matching the amount of tilt of the guides measured in this perpendicular plane with a tilting of the reconditioning tool so that the angle of the tool axis with respect to the reference plane is the same as the angle of the valve guide with respect to reference plane.

The device utilized for proper alignment of the plane defined by the axes of the valve guides that are being reconditioned comprises a flat bar having at least one straight, planar side, and having means to mount a bubble level to determine when the planar side is vertical. The means to mount comprises a pin mounted to be parallel to the flat planar side. Suitable tight fitting arbors or pins are placed into two of the valve guides. These arbors or pins can be slightly tapered at their lower ends if desired to tightly fit into the valve guides so that the pins are held coaxial with the axes of the valve guides. The taper of course should not protrude above the mounting surface of the cylinder head, but would be used only in connection with fitting the pins into the valve guides. The head itself is mounted in a fixture that has a tilting axis that is horizontal and parallel to the longitudinal axis of the head and to the plane defined by the axes of the arbors or pins. The head is placed into this fixture carefully so that a reference edge of the cylinder head is placed parallel to the tilting axis of the fixture and to a reference edge of the fixture base. Then when the pins are placed into the valve guides to be reconditioned, the flat bar is clamped to be flat against the pins so that the pin on the flat bar is parallel to the plane defined by the axes of the valve guides that are being reconditioned. Then the cylinder head is rotated in the fixture, and a bubble level is utilized on the flat bar to place the plane defined by the axes of the valve guides vertical and perpendicular to the horizontal support for the head support frame. Then the spindle of the tool itself is tilted relative to the vertical direction at an angle that brings the spindle supporting the reworking tool parallel to the axes of the valve guides. Then the valve guides are reconditioned in a normal manner.

DESCRIPTION OF THE PREFERRED EMBODIMENT

The apparatus for reconditioning cylinder heads is illustrated in general at 10. The general configuration of the machine is prior art and thus will be described rather briefly, and many of the showings in connection with the application will be schematic.

Figure 1:
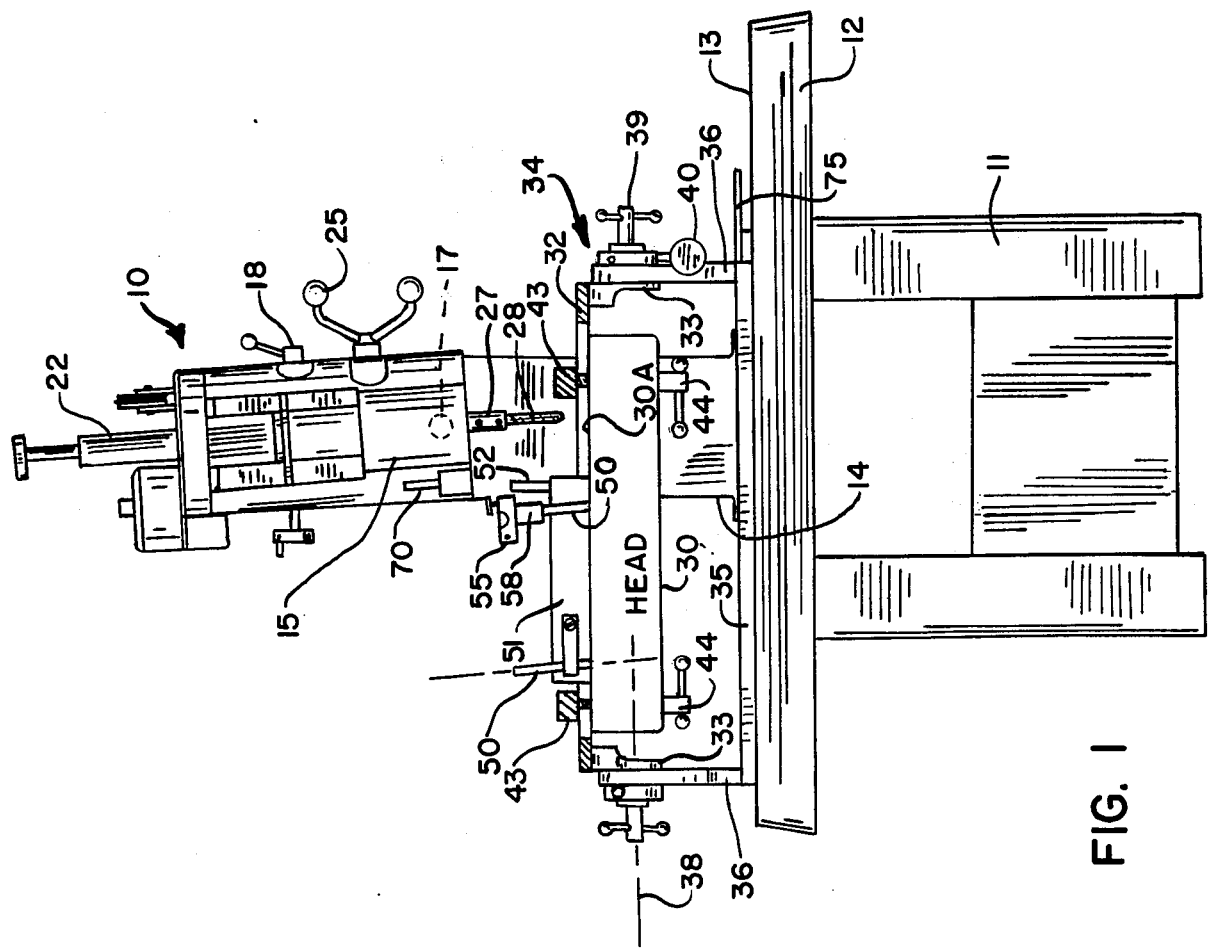
FIG. 1 is a front view of a engine head reconditioning machine utilizing the present invention.
Figure 9:
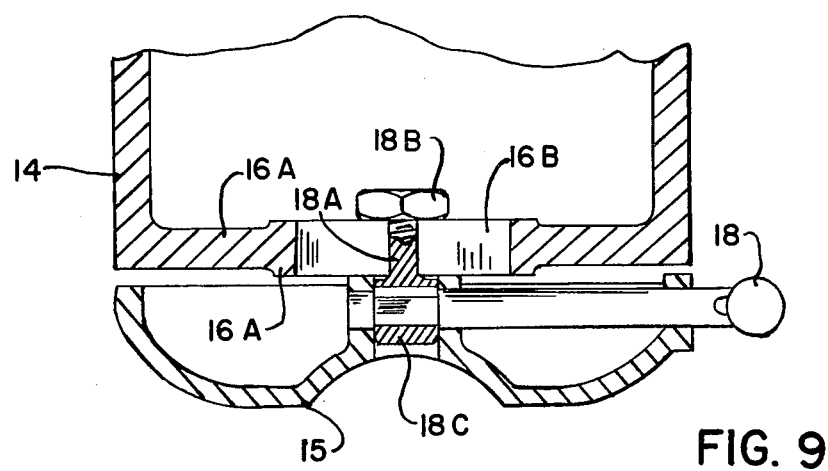
FIG. 9 is a fragmentary sectional view showing a typical clamp used for holding the machine of FIG. 1 in a tilted position.

In FIG. 1, the machine is illustrated to have a pedestal or support 11, a support table 12 which has a flat horizontal reference surface 13 that is made to be a precision working surface. Attached to the rear portion of table 12 is a support column 14 on which a power head assembly 15 is mounted for tilting movement about an axis parallel to surface 13. The power head assembly 15 is mounted relative to a front face surface indicated at 16 on the upper end of column 14. Surface 16 is an upright surface which is machined to be perpendicular to the surface 13 of the table. The power head assembly 15 can be tilted about the axis of a pin indicated generally at 17, which pin is pivotally mounted in the column 14 and adjacent the front face 16. The pin axis is parallel to surface 13 and perpendicular to surface 16. The power head assembly can be clamped with respect to the front surface 16 of the column through suitable clamping members 18. In FIG. 9 a typical clamp is shown. The front wall 16A has a generally horizontal slot 16B therein. A clamp bolt 18A extends through this slot and has a nut 18B locked on the bolt. A cam actuator 18C is used at the head of bolt 18A and this is operated by lever 18 so that when lever 18 is rotated the power head can be clamped tightly against the surface 16 or released with about a quarter turn. The slot 16B limits the amount of the tilting of the head about the pin 17. The lower end of the power head also can be clamped with a similar cam lock lever 19.

The power head assembly 15 includes a housing 21 that slidably mounts a spindle 22 like a drill press and the spindle 22 is driven through the use of a motor 23, and a speed change drive mechanism 24. The spindle can be moved up and down along its longitudinal axis as it rotates through the actuation of a spindle control wheel 25.

The use of a tilting spindle in a cylinder head reconditioning machine has been known previously, and thus the showing is somewhat schematic.

Figure 6:
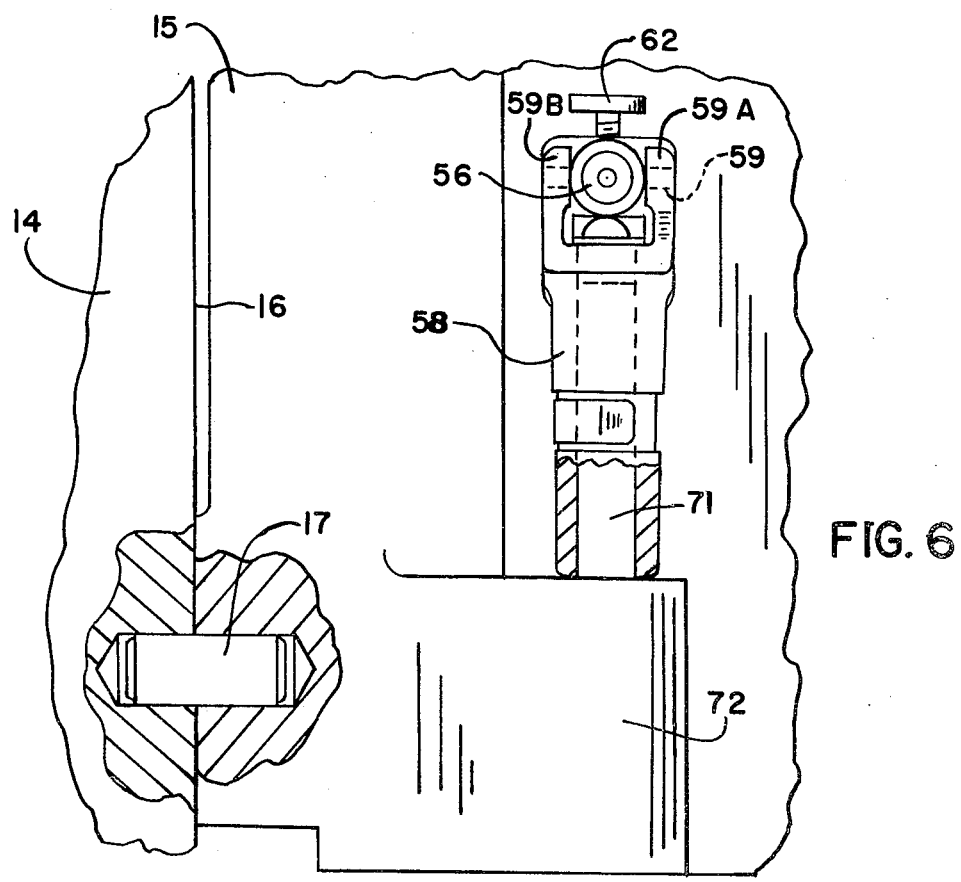
FIG. 6 is an enlarged fragmentary side view of the arrangement in FIG. 5.

The pin 17 is also shown in FIG. 6. The clamping mechanism for clamping the power head against surface 16 could be any suitable type of bolt or other clamp that securely holds the assembly 15 to the front surface 16 of the column 14.

The spindle 22 has a tool chuck 27 therein, which will mount a rotating working tool 28 such as a drill or reamer that will be used in reconditioning valve guides of a cylinder head shown schematicaly at 30, and which is mounted in a suitable head holder 31. The head holder 31 includes a center rectangular framework 32 mounted on end support members 33 which are in turn rotatably mounted with respect to a support 34 about an axis 38 extending along the longitudinal axis of the cylinder head. The support 34 has a base plate 35, and upright side columns 36 on which the members 34 are rotated. The position of the framework 30 can be changed about its pivot axis 38 and held in its position by locking suitable locking clamps indicated at 39. A fine adjustment screw member 40 may also be provided for controlling the tilt of the frame 32 about longitudinal axis 38. The frame is mounted so the edges of the longitudinal members of the frame 32 are parallel to the longitudinal edges of the base plate 35. The axis 38 is also parallel to these edges and to the surface 13 of the table 12. The base plate 35 of the head holder 31 is an air levitated or supported base plate. A supply of air under pressure provides an air bearing so the holder 31 can be easily moved along the surface 13. Such an air support is also shown in U.S. Pat. No. 3,782,847.

The cylinder head 30 to be reconditioned can be clamped onto the frame 32 through the use of cross clamping bars 43 held down against the side members of the frame 32 with through studs 44 that pass through the openings for head bolts. The reference surface 30A of the head, which rests on the cylinder block, is clamped tightly against framework 32 and thus this reference surface is parallel to axis 38. This clamping is also conventionally done, for example in the aforementioned U.S. Pat. No. 3,782,847.

In reworking cylinder heads, in particular reworking the valve guides, the problem of aligning the axis of each guide properly with the reconditioning tool 28 that is to be used has been present recently, particularly because the guides for valves have been positioned at a compound angle relative to the flat surface 30A of the head 30 which is clamped against the frame 32. The valve guides, which are arranged at a compound angle slant at an angle relative to the plane of surface 30A in two orthogonal directions.

Generally speaking, the intake valve guides are usually parallel to each other, and the axes of the exhaust valve guides are usually parallel to each other. The angle of the intake valve guides may be different from that of the exhaust valves, or they may be the same but offset, depending on the head. Thus the axes of all intake valve guides in the head define a common plane, and the axis of all exhaust valve guides in a head define a plane.

Figure 4:
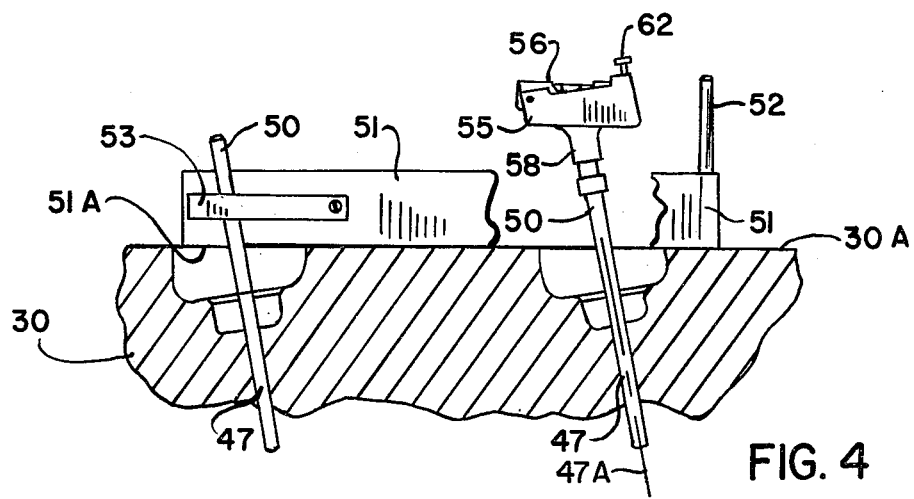
FIG. 4 is a schematic longitudinal sectional view through a typical engine head with the device of the present invention in place.

Referring to FIG. 4, an enlarged view taken through a typical cylinder head and looking generally from the left in FIG. 1, is shown. The head 30 is shown to have its mounting surface 30A against the frame 32 with the cross bar 43 holding the head in place. The head is oriented so that one side, for example side 30B is positioned parallel to the edge of frame member 32A. Thus the side 30B is also parallel to axis 38 and the edge of base 35 of the head holder. The head 30 has a typical valve passageway indicated generally at 45, which has a valve seat 46 therein, and the opening from the valve opens to the surface 30A in a conventional manner. The valve guide opening indicated at 47 is formed in the head 30, and this is where the valve stem normally operates during operation of the engine. The valve guide 47 is the opening or port that is to be drilled and reamed. In reworking a head 30, first the central axis of guide 47 is positioned perpendicular to the table surface 13. It can be seen that this axis which is indicated at 47A is canted with respect to the mounting plane of the head along surface 30A. The axis 47A is parallel to the axis of the same type of valves in the head. Thus the plane defined by two of the axes 47A must be positioned perpendicular to surface 13 to obtain proper orientation.

In order to obtain the orientation of this plane of the valve guides, a pilot pin or arbor indicated at 50 is forced into at least two of the valve guides 47. The arbors 50 are a close fit in the guides and are selected in size so that they snuggly fit within the guide 47 and are retained therein so that the center axes of the pins 50 are coaxial with axes 47A. This can be seen in FIG. 4, which is a schematic representation of the valve head 30, two pins 50 are placed in two separate guides, so that they are spaced in direction along the pivot axis 38 of the frame 32.

Figure 3:
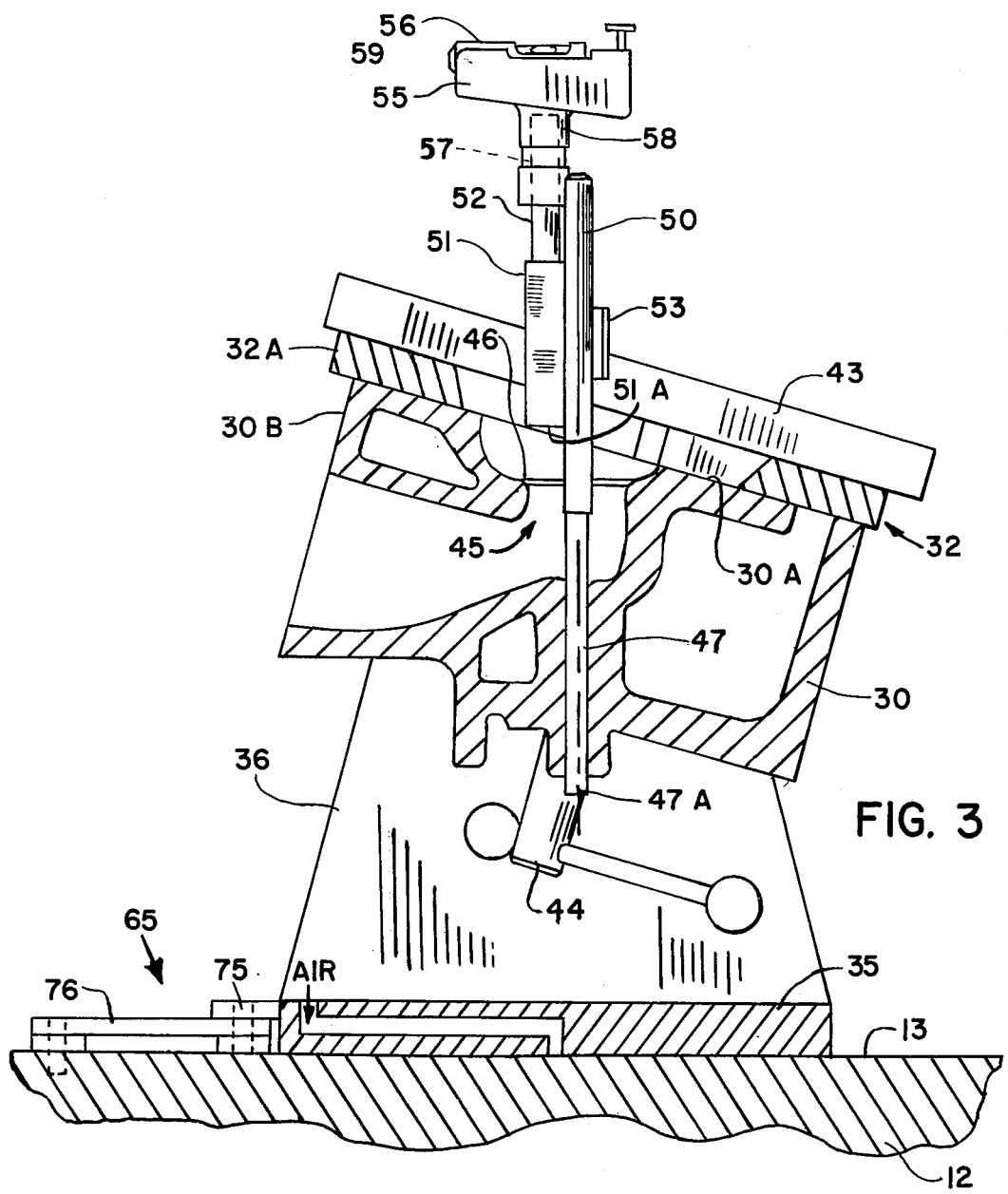
FIG. 3 is an enlarged vertical sectional view taken on line 3—3 of FIG. 1.

An alignment bar 51 is clipped onto one of the pins 50 and the side of the bar is placed in contact with both pins so the side surface is parallel to the pins. The edge of the bar is rested against the surface 30A. This alignment bar 51 has parallel side faces, a lower straight edge 51A and has a pin 52 fixed thereto which has a central axis also parallel to the side faces of the bar and perpendicular to the edge 51A. A spring clip 53 is provided on the bar 51, and this is used for clipping the bar to one of the pins 50 as shown in FIGS. 3 and 4. Therefore the axis of the pin 52 is exactly parallel to the plane of the pins 50 and therefor exactly parallel to the plane of the valve guide openings 47 and to the plane defined by their axes. Since axis 38 is horizontal, and surface 30A is parallel to the axis 38 the edge 51A is also horizontal and pin 52 is vertical. Stated another way the axis of pin 52 lies in a plane perpendicular to axis 38 of the frame and the pin axis stays in this plane as the head is tilted about axis 38. The plane of the axes 47A is also parallel to axis 38, as shown, because of the positioning of the edge 30B, which is the reference edge of the cylinder head.

An adjustable level indicator assembly indicated generally at 55, which has a close fitting bore that fits over the pin 52 is placed onto pin 52. The level member, which will be more fully explained, includes a bubble level 56. The bubble level has a longitudinal axis and the bubble indicates when this axis is horizontal, as commonly done. The level 56 can be adjusted to place its axis at different angular positions, and in the first step of the method of this invention the level is adjusted to indicate when the bore 57 of the mounting member 58 of the level indicator assembly is perpendicular to horizontal. Thus when the longitudinal axis of the bubble level 56 is positioned at substantially right angles to the axis 38, and the bubble in level 56 is centered, the axis of pin 52 will be vertical to the surface 13, which is initially positioned to be exactly horizontal.

The frame 32 and head 30 is rotated about the axis 38 (which is parallel to surface 13) until such time that the bubble level 56 indicates the proper position of the pins 50, and therefore when the axes 47A and the plane defined by these axes are perpendicular to the surface 13. The frame 32 is then clamped in its rotational position through the use of suitable clamps 39 of conventional design, and the initial step in positioning the head properly for reconditioning the valve guides is achieved. The bar 50 establishes a plane parallel to the plane of the guide axes which is then perpendicular to the surface 13.

The edge of the base 35 adjacent to the column 14 is positioned parallel to the surface 16 through the use of a parallel linkage assembly or fence illustrated generally at 65. The parallel linkage fence is used for guiding the base 35 so that the plane passing through the axes 47A, which is parallel to the side edge of the bar 51, is maintained parallel to the surface 16.

As viewed in FIG. 4, the guides 47 also incline or cant from the vertical in this vertical plane. The next step in the process of orienting the head properly is to determine this angle of cant, and match the angle of cant of the pins 50 as shown in FIG. 4 by tilting the axis of the working tool 28 at the same angle.

Figure 5:
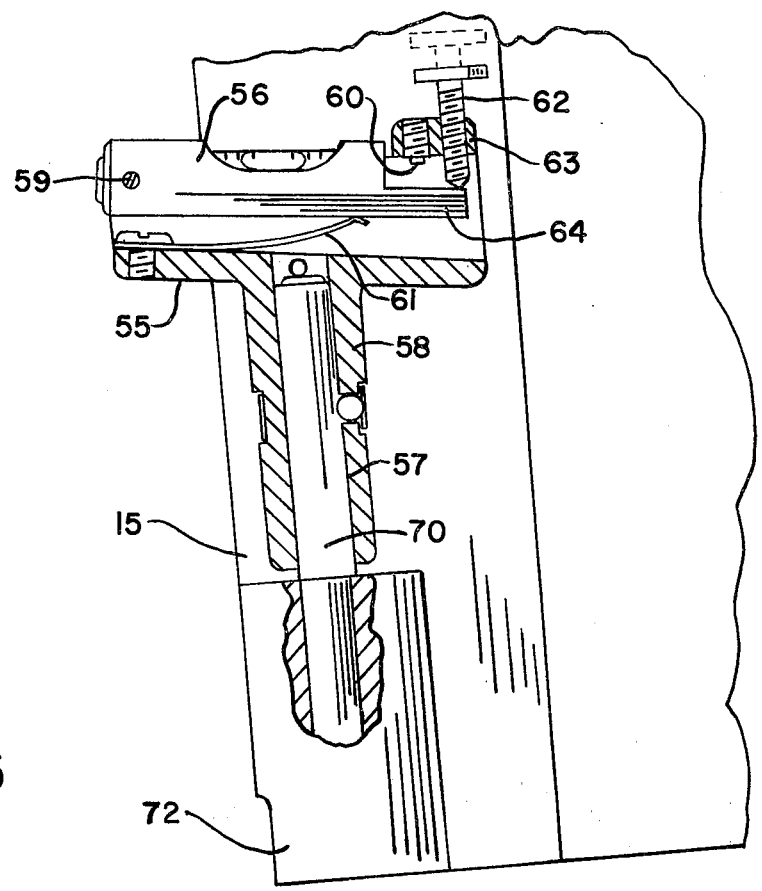
FIG. 5 is an enlarged front view of an alignment device placed on the machine of FIG. 1.

The structure and operation of the level indicator member 55 is important to understand. The device is shown in FIGS. 5 and 6. The level indicator member 55 has the bubble level housing 56 therein and this is mounted on a pivot pin 59 that extends between two side members 59A and 59B of the main housing (see FIG. 6). The bubble level housing therefore is movable about the pin 59 within the housing 55, as shown in FIG. 5. The bubble level 56 is urged upwardly about the pivot 59 to a position against a stop 60 through the use of a leaf spring 61 that is fastened in a suitable manner to the lower wall of the housing 55. The bubble level 56 can be moved against the action of this spring 61 by adjusting a screw 62 that is threadably mounted as at 63 above a tang portion 64 of the bubble level housing 56.

Thus, the inclination of the longitudinal axis of the bubble level can be changed with respect to the axis of bore 57.

The angle of slant of the pins 50 from vertical as shown in FIG. 4 is then determined by placing the bubble level assembly 55 so that the housing 58 fits over one pin 50, and adjusting the screw 62 until such time as the bubble indicates a level position in the bubble level housing 56.

The longitudinal axis of the bubble level is placed parallel to the axis 38, so that it aligns up with the side of the bar 51, and is therefore parallel also to the edge of the base 35 that engages the parallel linkage. Because the plane defined by the axis of pins 50 has been previously established as perpendicular to the table surface 13 an accurate reading is obtained. Visual orientation of the bubble level is sufficiently accurate, but if desired suitable guides could be utilized to keep the bubble level housing 55 in position so that the longitudinal axis of the bubble level is parallel to the side of the bar 51 and therefore is parallel to the plane defined by the axis 47A.

The housing 55 is then removed from the pin 50 (as shown in FIG. 4), and is placed onto an alignment pin 70 that is mounted onto the power head 15. The pin 70 has an axis that is parallel to the axis of the spindle 22 and thus to the tool 28, and any inclination of the pin 70 will result in equal inclination of the tool 28.

The bubble assembly is placed again with the longitudinal axis of the bubble level housing 56 parallel to the axis 38, or in other words parallel to the mounting surface 16 of column 14. The power head assembly 15 is released by releasing clamp means 18, and the power head is pivoted about pivot pin 17 (shown in FIG. 6) so that the axis of the spindle 22 tilts with respect to the vertical until the bubble level 56 indicates a level position. This will actually then cant the axis of pin 70 so that it is parallel to the axis of the pins 50 (because of the previous setting of the screws 62). The axis of the tool 28 then is parallel to the axis of the pins 50 and exactly parallel and properly oriented with respect to the axis 47A of each of the individual aligning valve guide bores.

Figure 2:
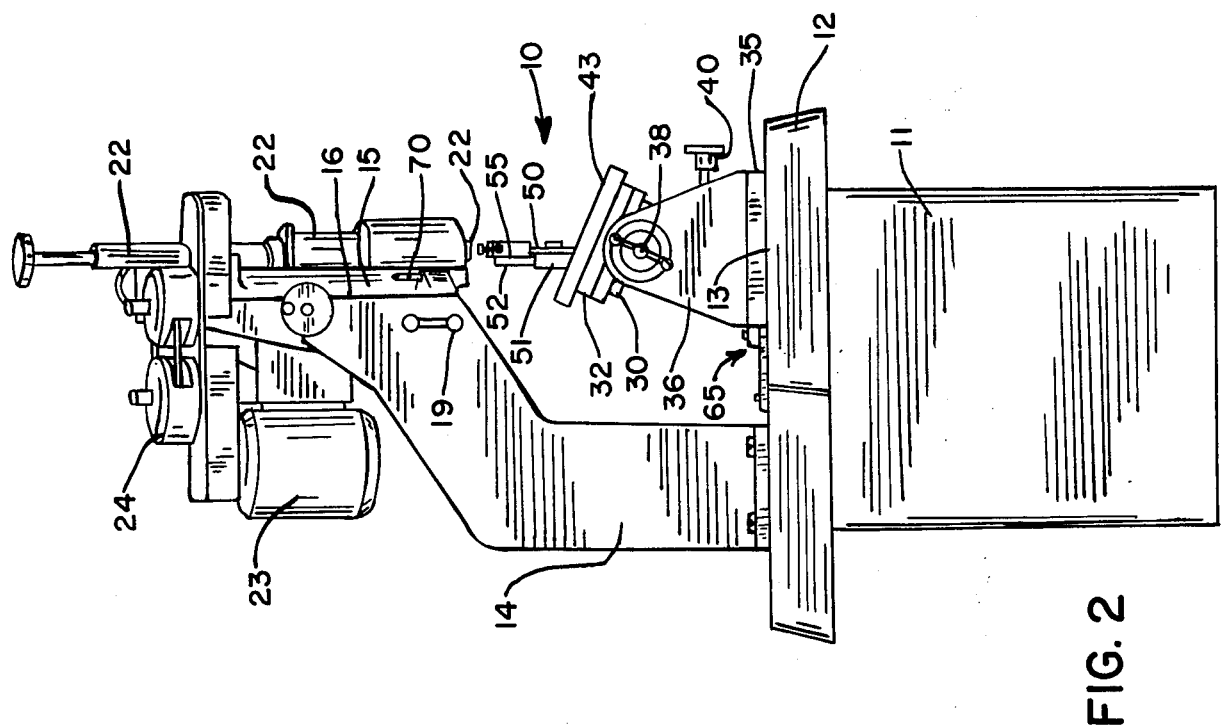
FIG. 2 is a side view of the device of FIG. 1.

The pin 70 as shown is mounted onto a boss 72 that is an integral part of the power head assembly 15. The pivot pin 17 which is shown is also positioned to the rear of the spindle, but is in the centered transverse direction as shown in FIG. 2.

Then, the pins 50 can be removed from the valve guide that is to be reconditioned, and the bar 51 also removed if desired. The head support frame 31 can be moved on its air cushion and guided by the parallel linkage fence assembly 65 to a position wherein the tool will enter the bore 47, and then drilling and reaming operations which are standard can proceed with assurance of proper alignment.

Figure 7:
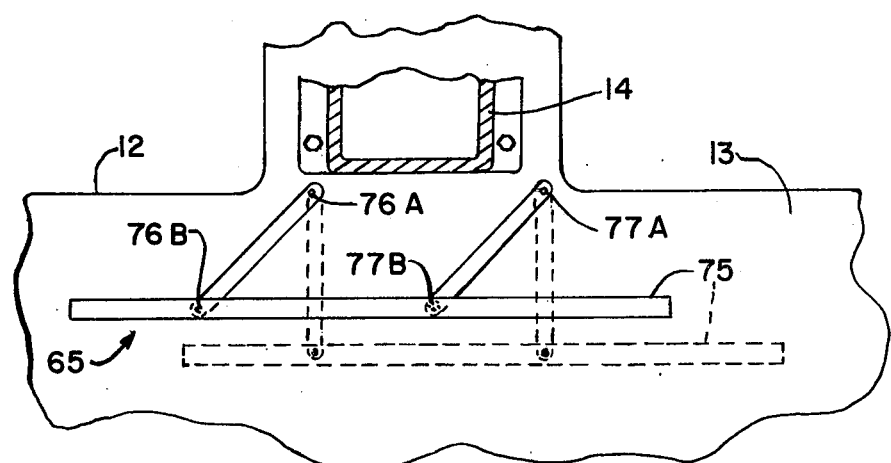
FIG. 7 is a fragmentary top view of a parallel linkage used on the machine of FIG. 1.
Figure 8:
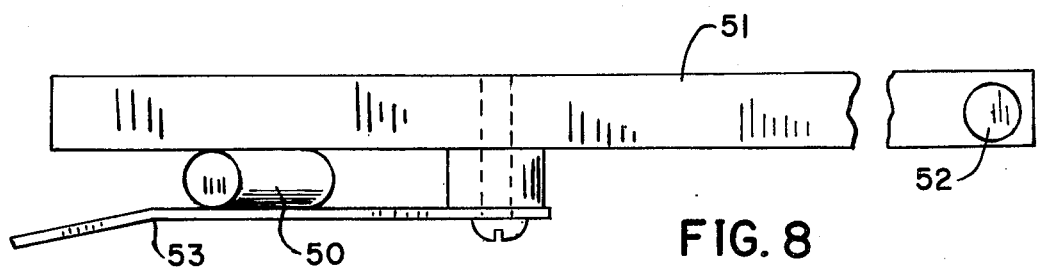
FIG. 8 is a top plan view of an alignment bar shown in FIG. 4.

The parallel linkage fence assembly 65 is perhaps best seen in FIG. 7, where the linkage is shown schematically. The fence assembly 65 includes a base guide link or fence 75, and parallel arms 76 and 77. The arms 76 and 77 are pivotally mounted as at 76A and 77A, respectively, with respect to the table 12, and pivot and slide along the top surface of the table when they are pivoted about these pivots 76A or 77A. The arms 76 and 77 are also pivotally mounted in parallel relationship to the fence or bar 75 at pivot points 76B and 77B, respectively, to provide the parallel linkage arrangement. The outer guide edge of the fence 75 will always remain parallel to the plane defined by the front face 16 on the pedestal 14, or looked at another way will always be perpendicular to the axis of the pin 17, which is the pivot axis for tilting the spindle 22. By using this bar 75 to guide the air supported head support, the plane defined by the axes 47A will remain parallel to the axis of the tool.

It is to be noted that the lever assembly 55 was previously used in prior art devices but only in connection with one pin 50. Attempting to bring the axis of the pin into a vertical plane was almost impossible because the pin 50 was canted and if the axis of the level was slightly out of square with axis 38 for example a very erroneous reading was obtained. The bar 51 establishes a plane parallel to the reference plane of axes 47A and pin 52 is perpendicular to surface 13. Thus slight rotation of the level assembly on pin 52 does not adversely affect positioning.

Thus, in summary, the method comprises placing the head on a horizontal reference mounting plane, placing arbors or pins in at least two similarly canted valve guides or bores, placing a straight side guide bar alongside at least two spaced arbors to establish a second plane, which guide bar includes a pin that has a axis perpendicular to the mounting plane of the head being worked on, and parallel to the straight side, using a level indicator mounted perpendicular to the second plane and tilting the head in a frame about the longitudinal axis of the head while keeping the axis horizontal until the level indicates the straight side of the guide bar is vertical and perpendicular to the reference mounting plane, determining the angle of tilt of the arbor pins from a vertical position after establishing the second plane at vertical, and then tilting the axis of the reconditioning tool about a horizontal axis perpendicular to the second plane until the tool axis is parallel to the axis of the arbor pins, while maintaining the plane defined by the axes of the valve guides parallel to the plane of tilting of the tool. The head support frame is floated on its air cushion until the tool and head are properly positioned but the support frame is rested on the table top while the reconditioning tool is working. The second plane is held parallel to its original position parallel to the tool axis during use of the tool.

The discussion has dealt with reworking the valve guides, primarily, but it is of course apparent that once the head is oriented properly the valve seats can be reworked along with the guides.

The valve seat reconditioning tool would be driven by spindle 22, as well.

What is claimed is:

1. An alignment tool for use in alignment of a cylinder head for an engine having a plurality of valve guides in the cylinder head each of which has an axis at the same compound angle with respect to a reference surface of the cylinder head to permit reconditioning said valve guides and for establishing a plane parallel to the plane defined by at least two of said valve guide axes when at least two bore pins having exterior surfaces are placed in two of said valve guides and positioned with the pin exterior surfaces parallel to the axis of the respective valve guides, and for use in combination with a bubble level having a receptacle for mounting said bubble level, said receptacle being oriented to have a receptacle axis perpendicular to the level axis of the bubble level, said tool comprising a bar member having at least one flat side surface adapted to extend between and bear against at least two bore pins mounted in two different valve guides in said head to place the flat side surface parallel to the plane defined by the axes of said valve guides, and having a straight edge extending along said flat surface, an auxiliary pin mounted on said bar and having an auxiliary pin axis parallel to said flat side surface and perpendicular to said straight edge, said auxiliary pin being of size to fit within the receptacle of a level indicator, and means on said bar member to mount said bar means to at least one of said two bore pins with the flat surface thereof physically engaging the exterior surfaces of both of said two bore pins.

2. A method for orienting a automotive cylinder head having a reference mounting surface and a reference edge, and having a plurality of valve guides with bore axes defined therein each at the same compound angle with respect to the reference surface, the bore axes of said plurality of valve guides lying in a common plane parallel to said reference edge, said bores opening to said reference surface, said process comprising the orientation of said common plane vertical with respect to a horizontal reference surface comprising the steps of mounting a head to be oriented in a frame having a tilting axis generally parallel to a horizontal support reference surface, supporting the head in the frame with said reference surface parallel to said tilting axis and with the reference edge of the head also parallel to said tilting axis to place the common plane defined by the axes of a plurality of bores generally parallel to said tilting axis, placing close fitting bore pins into at least two valve guide bores, said pins being spaced in direction along said common plane and along said tilting axis providing an alignment tool comprising a bar member of length to span said two pins in said bore axes and being mountable against said bore pins and said reference surface in a known relationship to the axis of said bore pins, said bar member having an auxiliary pin mounted thereon which has an axis lying in a plane perpendicular to the tilting axis and reference surface of said head when said bar member is in position mounted against said two bore pins and said reference surface, said auxiliary pin also being positioned parallel to said common plane, mounting a level indicator on said auxiliary pin with the longitudinal axis of said level indicator generally perpendicular to the tilting axis, and tilting the cylinder head about said tilting axis until the level indicator indicates the auxiliary pin is vertical.

3. The method of claim 2 including the step of mounting a bubble level on said alignment tool to comprise the level indicator.

4. The method of claim 3 including the further step of placing an adjustable level indicator on one of the pins in said valve guide after orienting the plane of said axis perpendicular to the horizontal surface, adjusting the level indicator to indicate the angle of tilt of the axis of said pin from vertical, and using the level indicator as a guide to tilt the axis of a spindle of a valve guide reconditioning tool to a position parallel to the axis of said pin.

5. The method of claim 4 wherein said spindle is tilted about a horizontal axis perpendicular to the plane of the bore axes of said valve guides and parallel to the horizontal reference surface.

6. The method of claim 4 including the step of guiding said frame through a parallel linkage to maintain the frame and the axis of tilt of said frame parallel to a desired reference position, and perpendicular to the axis of tilt of said spindle.

7. A method of orienting a cylinder head having valve guides with bore axes at compound angles with respect to a first reference surface of said cylinder head to place the bore axes into a plane perpendicular with respect to a second reference support surface, comprising the steps of mounting said head in a frame having a tilting axis generally parallel to said second reference support surface, supporting the head in the frame with the plane defined by the axes of said valve guides parallel to said tilting axis, placing close fitting cylindrical pins in said valve guides so that tangent lines on the side surfaces of said pins parallel to the pin axes are parallel to the plane defined by said bore axes and extend outwardly beyond the first reference surface, placing an alignment tool on the first reference surface and against the surfaces of said pins, said alignment tool including a level indicator mounted to indicate a level condition when the alignment tool is in place and the plane defined by the bore axes is vertical, and tilting said cylinder head about the tilting axis of said frame until the level indicator indicates a level condition.

8. The method of claim 7 including the step of mounting an adjustable bubble level on said alignment tool to comprise the level indicator.